US008873774B2

(12) United States Patent
Rijken et al.

(10) Patent No.: US 8,873,774 B2
(45) Date of Patent: Oct. 28, 2014

(54) AUDIO MIXER

(75) Inventors: Christopher Rijken, Houston, TX (US); Michael Durham, Tomball, TX (US); Mark Tupa, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 12/847,031

(22) Filed: Jul. 30, 2010

(65) Prior Publication Data

US 2012/0027228 A1 Feb. 2, 2012

(51) Int. Cl.
*H04B 1/00* (2006.01)
*H04H 60/04* (2008.01)

(52) U.S. Cl.
CPC .................................... *H04H 60/04* (2013.01)
USPC ............... 381/119; 381/74; 381/81; 381/123; 381/92; 455/575.2

(58) Field of Classification Search
CPC ...... H04R 5/04; H04R 2420/05; H04R 3/005; H04R 27/00; H04R 2499/13; H04R 2420/01; H04R 2420/03; H04R 3/02; H04R 29/00; G06F 3/16; G06F 3/165; H04M 3/56; H04M 3/568; H04M 3/563; H04M 3/569; H04H 20/26; H03G 3/34; H03G 3/341; H03G 3/345; H04B 1/3805; H04B 15/00; H04B 1/20; H04B 1/1027; G10L 19/00
USPC .............. 381/74, 71.1, 71.5, 71.6, 71.7, 71.8, 381/71.11, 71.12, 71.13, 71.14, 72, 73.1, 381/99, 317, 318, 119, 94, 309, 36, 81, 84, 381/85, 334, 92, 94.5, 120, 122, 123; 370/433.01, 433.02, 433.03, 433.05, 370/433.11, 433.12, 433.13, 432, 421; 700/94; 455/556, 575.2, 575.1, 556.2, 455/569.1
See application file for complete search history.

(56) References Cited

U.S. PATENT DOCUMENTS

| | | | |
|---|---|---|---|
| 2003/0087667 A1* | 5/2003 | Taniguchi et al. | 455/556 |
| 2008/0102906 A1* | 5/2008 | Dijkstra et al. | 455/575.2 |
| 2008/0175402 A1* | 7/2008 | Abe et al. | 381/71.6 |
| 2009/0248402 A1* | 10/2009 | Ito et al. | 704/201 |

FOREIGN PATENT DOCUMENTS

| | | | |
|---|---|---|---|
| JP | 60080311 A * | 5/1985 | H03G 3/34 |

* cited by examiner

*Primary Examiner* — Leshui Zhang
(74) *Attorney, Agent, or Firm* — Chun-Liang Kuo

(57) ABSTRACT

Managing audio of a device including transmitting a signal through a port of the device in response to an audio device coupling to the port, initializing an audio mixer of the device in response to detecting the signal, and configuring the audio mixer to manage audio transferred between the device and the audio device.

16 Claims, 7 Drawing Sheets

AUDIO MIXER

BACKGROUND

When managing an audio device, an interface of the audio device can be physically coupled to an audio jack of a device. Once the audio device is coupled to the device, the audio device and/or the device can generate and output one or more noises. Additionally, a user can proceed to configure the audio device by modifying one or more settings on the device. In response to configuring the audio device, the device can proceed to manage the audio device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By transmitting a signal through a port of a device in response to an audio device coupling to the port, the device can accurately determine when an audio device has coupled to a device. Additionally, by initializing an audio mixer for the device to use in response to the audio device coupling to the device, an amount of popping or clicking noise associated with enabling and/or disabling the audio mixer or an amount of popping or clicking noise associated with the audio device coupling to the device can be reduced. Further, by configuring the audio mixer to manage audio transferred between the device and the audio device, audio can efficiently be transferred between the audio device and the device. As a result, a more user friendly experience can be created for a user of the device.

Figure 1:
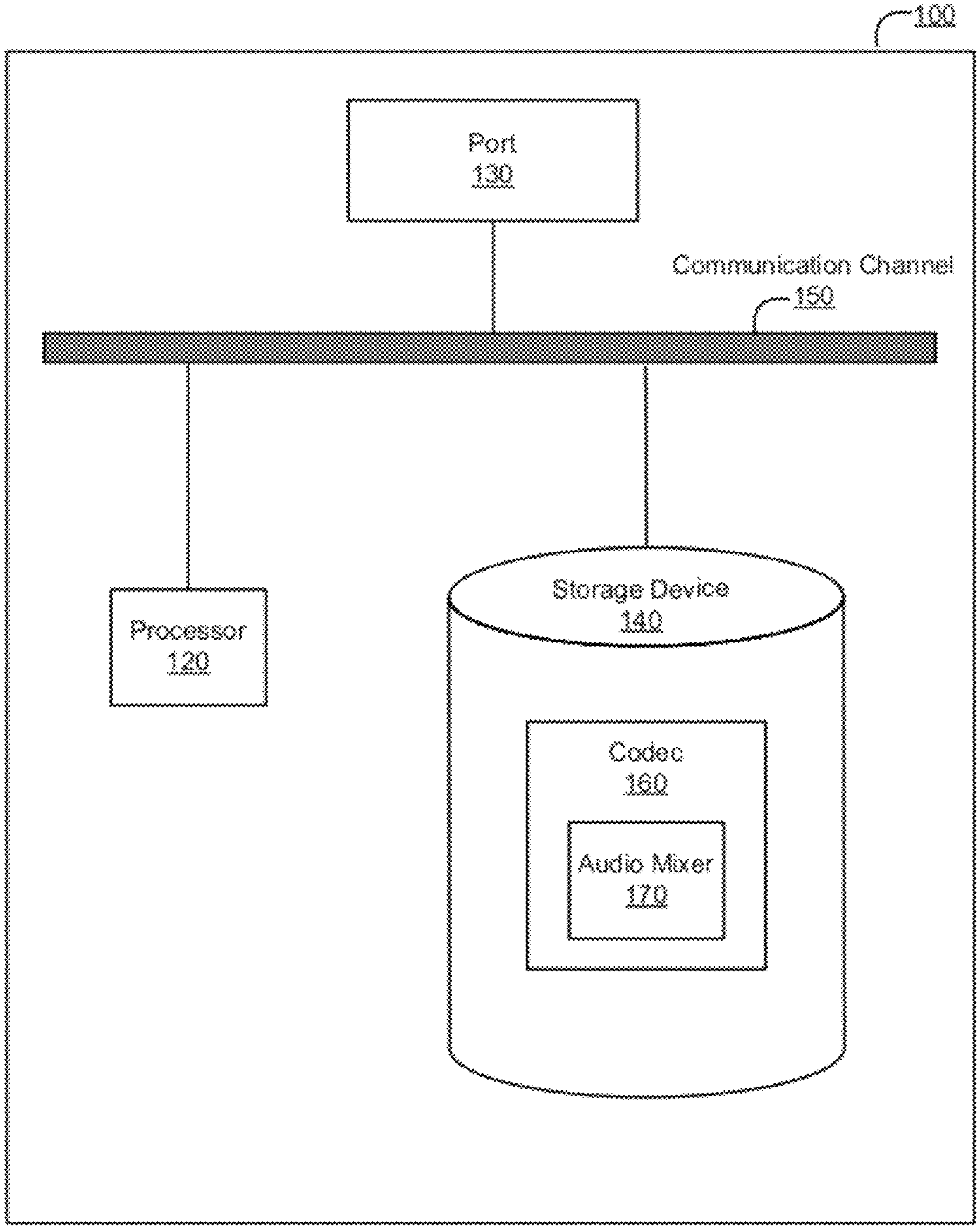
FIG. 1 illustrates a device with at least one port according to an embodiment of the invention.

FIG. 1 illustrates a device 100 with a port 130 according to an embodiment of the invention. In one embodiment, the device 100 is a desktop, a laptop, a tablet, a netbook, an all-in-one system, a server, and/or any additional computing machine. In another embodiment, the device 100 is a GPS, a cellular device, and/or a PDA. In other embodiments, the device 100 is a media device, a radio device, and/or any additional device 100 which can include one or more ports 130.

As illustrated in FIG. 1, the device 100 includes a processor 120, at least one port 130, a storage device 140, and a communication channel 150 for the device 100 and/or one or more components of the device 100 to communicate with one another. Additionally, the storage device 140 can be configured to include a codec 160 and an audio mixer 170 of the codec 160. In one embodiment, the storage device 140 is additionally configured to include an audio application. In other embodiments, the device 100 includes additional components and/or is coupled to additional components in addition to and/or in lieu of those noted above and illustrated in FIG. 1.

As noted above, the device 100 includes a processor 120. The processor 120 sends data and/or instructions to the components of the device 100, such as the port 130, the codec 160, the audio mixer 170, and the audio application. Additionally, the processor 120 receives data and/or instructions from components of the device 100, such as the port 130, the codec 160, the audio mixer 170, and the audio application.

The audio application is an application which can be utilized in conjunction with the processor 120 to control or manage an audio mixer 170. For the purposes of this application, an audio mixer 170 is a software and/or hardware component of the device 100 configured to modify, route and/or combine audio received and/or sent from the device 100. When modifying, routing, and/or combining audio, the audio mixer 170 can merge or split one or more audio signals and/or audio streams. In another embodiment, when modifying, routing, and/or combining audio, the audio mixer 170 can increase, decrease, and/or filter one or more parameters of an audio equalizer.

Additionally, as illustrated in FIG. 1, the audio mixer 170 can be included in a codec 160 of the device 100. In another embodiment, the audio mixer 170 can be included as part of an operating system or firmware of the device 100. For the purposes of this application, a codec 160 is a hardware and/or software component of the device 100 configured to encode and/or decode audio/video data or signals. In one embodiment, when encoding and/or decoding audio/video data or signals, the codec 160 can encrypt, store, and/or transmit the audio/video data or signals. Additionally, the encoded and/or decoded audio/video data or signals can be used for audio/video playback or media editing.

When controlling and/or managing the audio mixer 170, the processor and/or the audio application can initially detect a signal transmitted from a port 130 of the device 100. The signal can be a digital or analog signal generated in response to an audio device coupling to the port 130. An audio device includes a device or component configured to interface with the device 100 and input and/or output audio. In response to detecting an audio device coupling to the port 130, the processor 120 and/or the audio application proceeds to initialize the audio mixer 170. Once the audio mixer 170 has been initialized, the processor 120 and/or the audio application can then configure the audio mixer 170 to manage audio transferred between the device 100 and the audio device.

The audio application can be firmware which is embedded onto the processor 120, the device 100, and/or the storage device 140. In another embodiment, the audio application is a software application stored on the device 100 within ROM or on the storage device 140 accessible by the device 100. In other embodiments, the audio application is stored on a computer readable medium readable and accessible by the device 100 or the storage device 140 from a different location.

Additionally, in one embodiment, the storage device 140 is included in the device 100. In other embodiments, the storage device 140 is not included in the device 100, but is accessible to the device 100 utilizing a network interface included in the device 100. The network interface can be a wired or wireless network interface card. In other embodiments, the storage device 140 can be configured to couple to one or more ports or interfaces on the device 100 wirelessly or through a wired connection.

In a further embodiment, the audio application is stored and/or accessed through a server coupled through a local area network or a wide area network. The audio application communicates with devices and/or components coupled to the device 100 physically or wirelessly through a communication bus 150 included in or attached to the computing machine 100. In one embodiment the communication bus 150 is a memory bus. In other embodiments, the communication bus 150 is a data bus.

As noted above, the processor 120 can be utilized in conjunction with the audio application to detect a transmitted signal which is generated in response to an audio device coupling to at least one port 130 of the device 100. A port 130 is a component of the device 100 configured to couple the device 100 to an audio device or an interface of the audio device. Additionally, the port 130 is configured to transmit one or more signals to the processor 120 and/or the audio application in response to the audio device coupling to the port 130.

Figure 2:
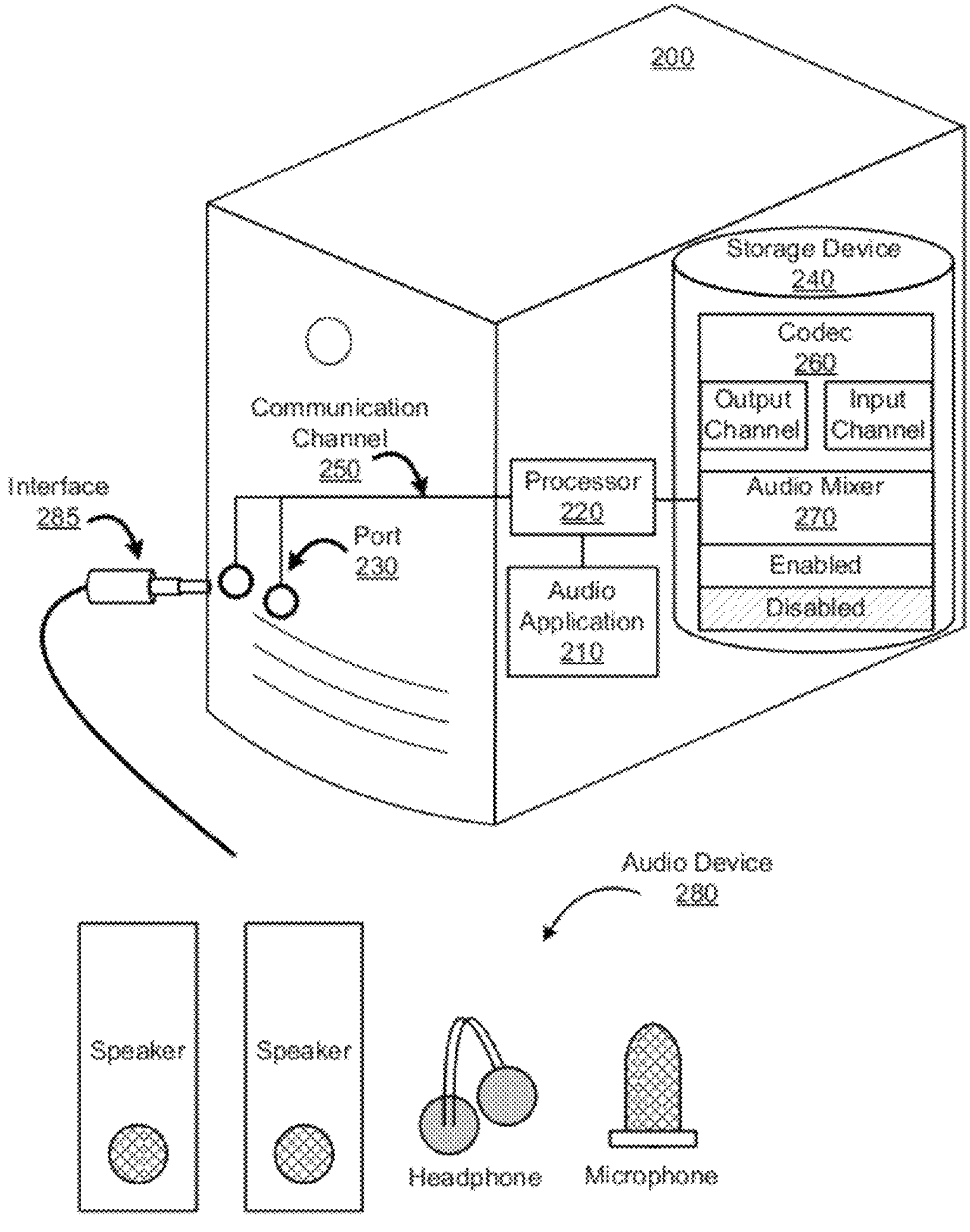
FIG. 2 illustrates an audio device coupling to at least one port of device according to an embodiment of the invention.

FIG. 2 illustrates an audio device 280 coupling to at least one port 230 of a device 200 according to an embodiment of the invention. As shown in the present embodiment, at least one port 230 can physically engage and couple with an interface 285 of the audio device 280. In one embodiment, a port 230 of the device 200 can be or include an audio jack. Additionally, as shown in FIG. 2, a port 230 can be coupled to one or more locations on or around the device 200. In other embodiments, a port 230 can be integrated as part of the device 200 or the port 230 can be coupled to or integrated as part of one or more components of the device 200.

As noted above, the port 230 can couple and interface an audio device 280 with the device 200. When interfacing with the port 230, an interface 285 of the audio device 280 can include one or more physical components configured to physically couple an audio device 280 with the port 230. In one embodiment, the interface 285 can be inserted into the port 230 when coupling the audio device 280 to the device 200. In another embodiment, the port 230 and/or the interface 285 can include an infrared device, a Bluetooth device, a radio device, and/or any additional wireless device or component configured to engage and interface with one another through a wireless connection when coupling the audio device 280 with the device 200.

As shown in FIG. 2, an audio device 280 can include a speaker, a headphone, a microphone and/or any device or component configured to input and/or output audio. In other embodiments, the audio device 280 can include any additional device or component configured to interface with the device 200 and transfer audio between the audio device 280 and the device 200 in response to coupling to the port 230. In response to the audio device 280 coupling to the port 230, the port 230 can transmit one or more signals to the processor 220 and/or the audio application 210.

A signal can be an analog or a digital signal generated from the audio device 280 once the audio device 280 has coupled to the port 230. In another embodiment, the port 230 can include one or more switches configured to generate a signal in response to detecting the audio device 280 coupling to the port 230. The switch can be an electrical switch and/or mechanical switch which can be triggered to generate the signal in response to the switch or port 230 detecting the audio device 280.

In response to detecting an audio device 280 coupling to the port 230, the port 230 proceeds to transmit the signal to a processor 220 and/or an audio application 210 through a communication channel of the device 200. As shown in FIG. 2, the port 230 is coupled to the processor 220 and/or the audio application 210 through the communication channel 250 of the device 200. Additionally, when detecting a signal from the port 230, the processor 220 and/or the audio application 210 can continuously and/or periodically detect or scan the communicant channel 250 for a signal.

In response to detecting the signal, the processor 220 and/or the audio application 210 can proceed to initialize an audio mixer 270. As illustrated in the present embodiment, the audio mixer 270 is included in a codec 260 of the device 200. In another embodiment, the audio mixer 270 can be included as part of an operating system of the device 200. As noted above, a codec is a hardware and/or software component of the device 200 configured to encode and/or decode audio/video signals received from the audio device 280 and/or sent from the device 200.

Additionally, an audio mixer 270 is a hardware and/or software component configured to modify, route, and/or combine one or more of the audio signals from the codec 260. As shown in the present embodiment, one or more audio mixers 270 and/or codec 260 can be stored and accessed from a storage device 240 of the device 200. In other embodiments, one or more codec 260 and/or audio mixers 270 can be stored on additional locations accessible to the processor 220 and/or the audio application 210 in addition and/or in lieu of those noted above and illustrated in FIG. 2.

Additionally, the codec 260 includes one or more input channels and/or one or more output channels for transferring audio signals between the device 200 and the audio device 280. An input channel is configured to receive audio signals for the codec 260 to encode or decode. Additionally, an output channel is configured to output or transfer audio signals decoded or encoded by the codec 260. For the purposes of this application, one or more audio signals include analog or digital signals which can be encoded and/or decoded by the codec 260 as audio. Additionally, as shown in the present embodiment, an input channel and/or an output channel can initially be disconnected from one another. The input channel and/or the output channel are disconnected when the audio mixer 270 is in a disabled state.

As shown in the present embodiment, the audio mixer 270 can include an enabled state and a disabled state. Additionally, the audio mixer 270 can transition between the disabled state and the enabled state in response to the audio device 280 coupling to the device 200. When in a disabled state, the input channel and/or the output channel of the codec 260 are not connected and the audio mixer 270 does not manage audio signals sent to or from the codec 260 or the device 200. As a result, popping or clicking noises are not generated by the device 200 or the audio device 280 when the audio mixer is disabled. In another embodiment, if the audio mixer 270 is in an enabled state, the audio mixer 270 can manage audio transferred between an audio device 280 and the device 200.

Figure 3:
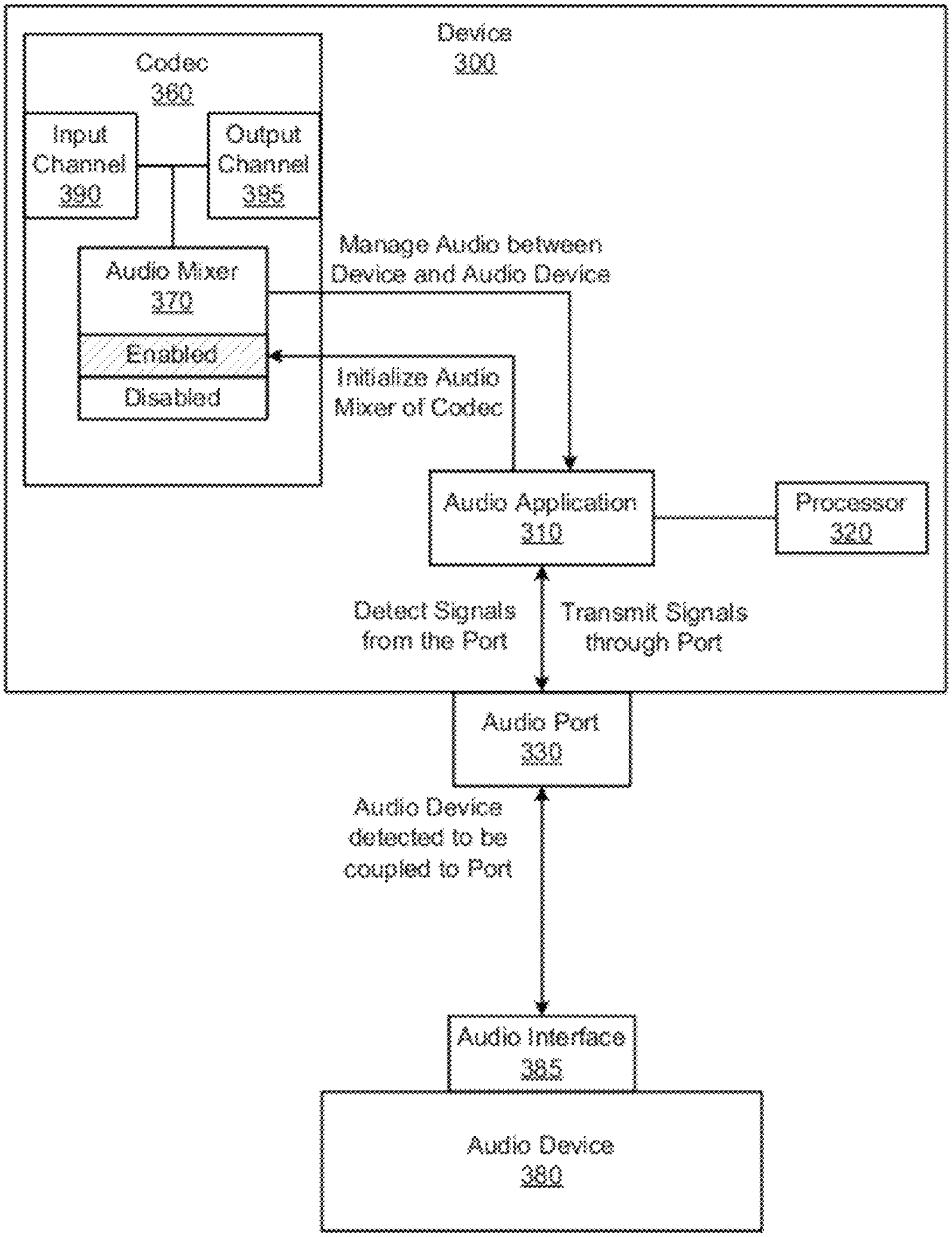
FIG. 3 illustrates a block diagram of an audio application initializing an audio mixer in response to an audio device coupling to a device according to an embodiment of the invention.

FIG. 3 illustrates a block diagram of an audio application 310 initializing an audio mixer 370 in response to an audio device 380 coupling to a device 300 according to an embodiment of the invention. As shown in the present embodiment, an audio interface 385 of the audio device 380 has been detected to couple to an audio port 330 of the device 300. In response, the port 330 proceeds to transmit a signal to the audio application 310 and/or the processor 320. In one embodiment, the audio application 310 and/or the processor 320 additionally pass any detected signals to the codec 360 and/or the audio mixer 370.

As noted above, the signal can be generated by the audio device 380 or by a component of the audio port 330. In one embodiment, the transmitted signal does not include any audio data. In another embodiment, the transmitted signal can include audio data from the audio device 380. In response to detecting a signal from the port 330, the audio application 310 and/or the processor 320 proceed to initialize the audio mixer 370 of the codec 360.

When initializing the audio mixer 370, the audio application 310 and/or the processor 320 send one or more instructions for the codec 360 to initialize the audio mixer 370. In response to receiving the instruction from the audio application 310 and/or the processor 320, the codec 360 proceeds to transition the audio mixer 370 from a disabled state to an enabled state. In another embodiment, the audio application 310 and/or the processor 320 directly access the audio mixer 370 and send an instruction to initialize and/or enable the audio mixer 370. In other embodiments, the codec 360 can automatically initialize and/or enable the audio mixer 370 in response to detecting the signals passed from the audio application 310 and/or the processor 320.

As illustrated in FIG. 3, in response to the audio mixer 370 being initialized or enabled, the audio mixer 370 proceeds to access one or more input channels 390 and one or more output channels 395 of the codec 360. Additionally, the audio mixer 370 interfaces with one or more of the input channels 390 and one or more of the output channels 395 and proceeds to connect them to one another. In response to connecting an input channel 390 to an output channel 395, the audio mixer 370 can manage audio transferred between the device 300 and the audio device 380.

Figure 4:
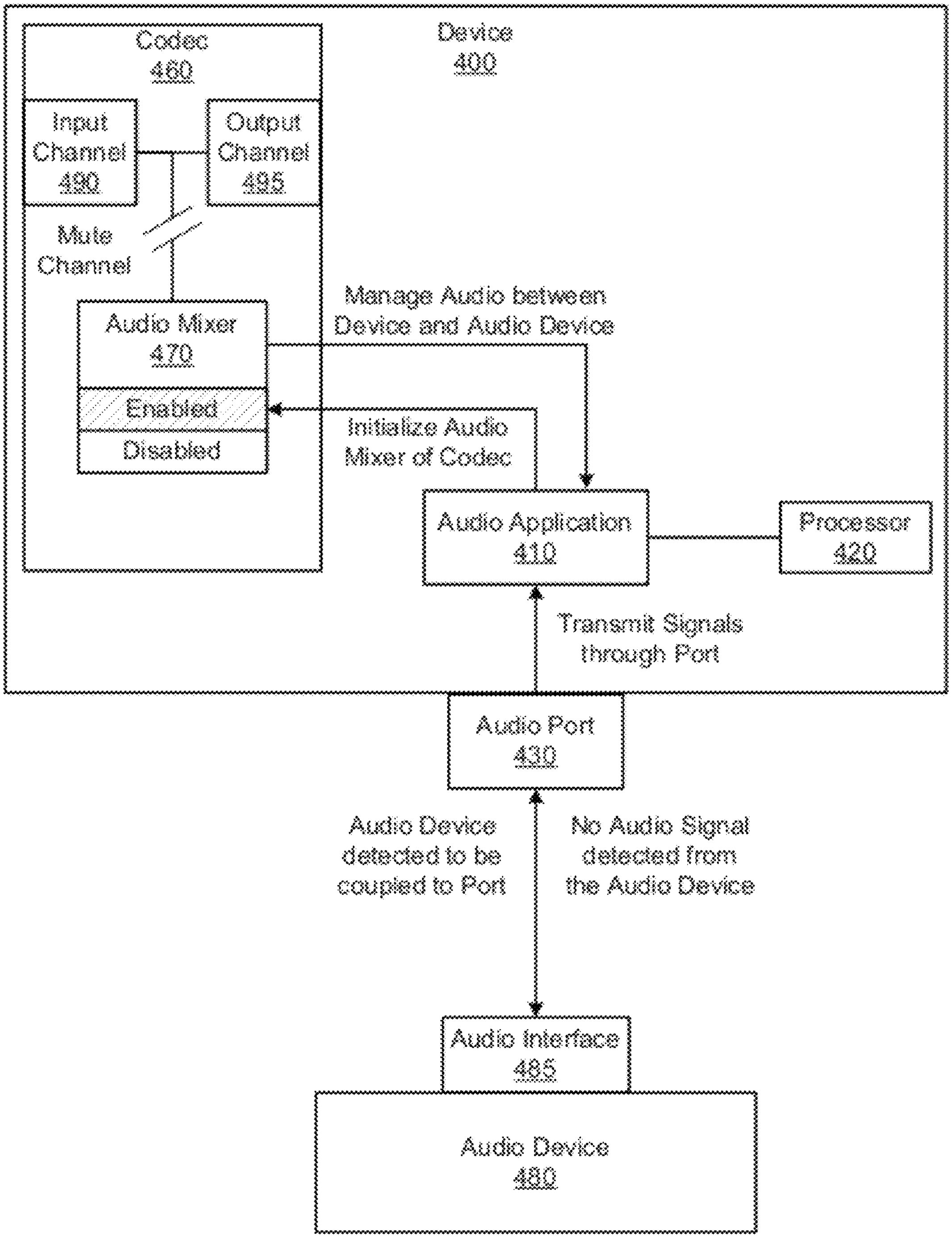
FIG. 4 illustrates a block diagram of an audio mixer managing audio between a device and an audio device according to an embodiment of the invention.

FIG. 4 illustrates a block diagram of an audio mixer 470 managing audio between a device 400 and an audio device 480 according to an embodiment of the invention. As shown in the present embodiment, the audio mixer 470 has been initialized and/or enabled in response to the audio device 480 coupling to the port 430 of the device 400. Additionally, the audio mixer 470 proceeds to manage audio transferred between the device 400 and the audio device 400.

When managing audio transferred between the device 400 and the audio device 480, the audio mixer 470 will access the input channels 490 and/or the output channels 495 and detect any signals generated by the device 400 or the audio device 480. One or more signals can be passed from the port 430 of the device 400 to an input channel 490 and/or an output channel 495 of the codec 460 in response to the audio mixer 470 initializing and connecting the input channel 490 to the output channel 495.

If any signals are detected in the input channel 490 and/or the output channel 495, the processor 420 and/or the audio application 410 will instruct the codec 460 to determine whether the signal is an audio signal. The codec 460 will analyze any signal detected from the input channel 490 and/or the output channel 495 and determine whether the signal includes audio data. If the signal includes audio data, then the codec 460 will determine that an audio signal has been detected.

As noted above, an audio signal is a digital or analog signal which includes audio data which can be managed by the audio mixer 470. One or more audio signals can be generated by the device 400, the audio application 410, the processor 420, and/or another component of the device 400 for the audio mixer 470 to manage when outputting audio through the audio device 480. Additionally, one or more audio signals can be generated by the audio device 480 and transmitted to the device 400 for the audio mixer 470 to manage when inputting audio.

As illustrated in the present embodiment, if the audio mixer 470 does not detect any audio signals from the device 400, the audio application 410, the processor 420, another component of the device 400, and/or the audio device 480, the audio mixer 470 can be muted. When muting the audio mixer 470, the audio mixer 470 can mute the input channel 490 of the codec 460. In another embodiment, if no audio signal is detected, the audio mixer 470 can proceed to mute the output channel 490. In other embodiments, the audio mixer 470 can mute both the input channel and the output channel if no audio signal is detected.

The input channel 490 and/or the output channel 495 can continue to remain muted to reduce popping or clicking noises until the audio mixer 470 detects an audio signal from the device 400, the audio application 410, the processor 420, another component of the device 400, and/or the audio device 480. In one embodiment, if an audio signal is detected from the device 400, the audio application 410, the processor 420, and/or another component of the device 400, the audio mixer 470 proceed to un-mute the output channel 490 of the codec 460. The audio signal can then be transferred through the port 430 to the audio device 480 for outputting. While, the output channel 495 is un-muted, the audio mixer 470 can continue to mute the input channel 490.

In another embodiment, if an audio signal is detected from the audio device 480, the audio mixer 470 can proceed to un-mute the output channel 495 and transfer audio from the audio device 480 through the port 430 and to the device 400. While the input channel 490 is un-muted, the audio mixer 470 can continue to mute the output channel 495. In other embodiments, in response to detecting any audio signals, the audio mixer 470 can proceed to un-mute both the input channel 490 and the output channel 495 of the codec 460.

Additionally, while the audio mixer 470 is managing audio between the device 400 and the audio device 480, the processor 420 and/or the audio application 410 can determine if the audio device 480 has decoupled from the port 430 of the device 400. When determining whether the audio device 480 has decoupled from the port 430, the processor 420 and/or the audio application 410 can poll the port 430 or continue to detect for one or more signals from the port 430. If the audio application 410 and/or the processor 420 do not detect any signal from the port 430, the processor 420 and/or the audio application 410 will determine that the audio device 480 has decoupled from the port 430.

In another embodiment, the processor 420 and/or the audio application 410 can directly interface and/or connect with the audio device 480 through the port 430. While the processor 420 and/or the audio application 410 maintain the interface and/or connection, the audio device 480 will be determined to be coupled to the port 430. If the interface and/or connection is broken, the audio device 480 will be determined to be decoupled from the port 430.

In response to detecting the audio device 480 decoupling from the port 430, the processor 420 and/or the audio application 410 will proceed to disable the audio mixer 470. When disabling the audio mixer 470, the audio mixer 470 will decouple one or more input channels 490 of the codec 460 from one or more output channels 495 of the codec 460. In another embodiment, the codec 460, the processor 420, and/or the audio application 410 will additionally disable the audio mixer 470.

Figure 5:
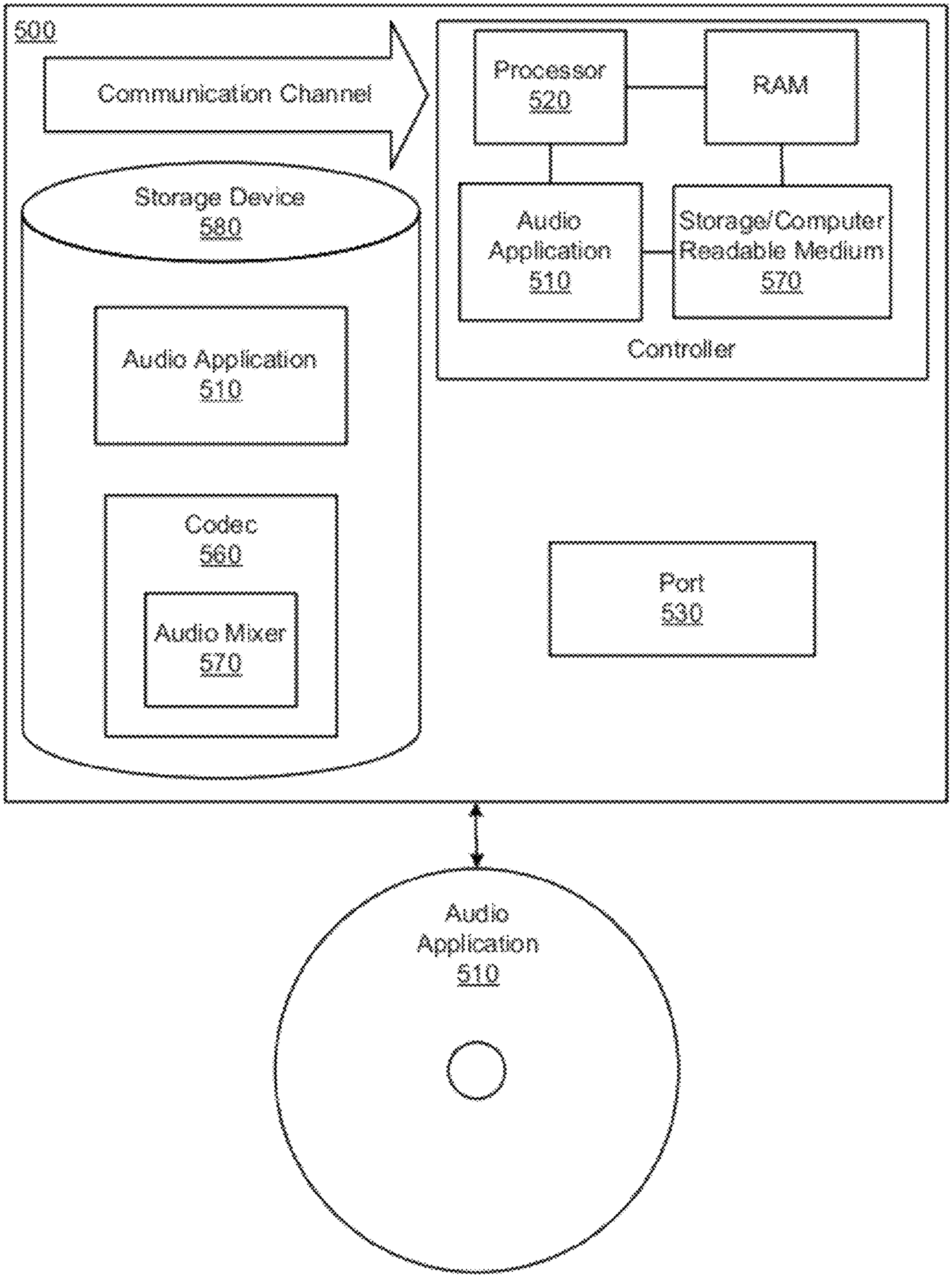
FIG. 5 illustrates an audio application on a computing machine and a response application stored on a removable medium being accessed by the computing machine according to an embodiment of the invention.

FIG. 5 illustrates a device with a response application 510 and a response application 510 stored on a removable medium being accessed by the device 500 according to an embodiment of the invention. For the purposes of this description, a removable medium is any tangible apparatus that contains, stores, communicates, or transports the application for use by or in connection with the device 500. As noted above, in one embodiment, the response application 510 is firmware that is embedded into one or more components of the device 500 as ROM. In other embodiments, the response application 510 is a software application which is stored and accessed from a hard drive, a compact disc, a flash disk, a network drive or any other form of computer readable medium that is coupled to the device 500.

Figure 6:
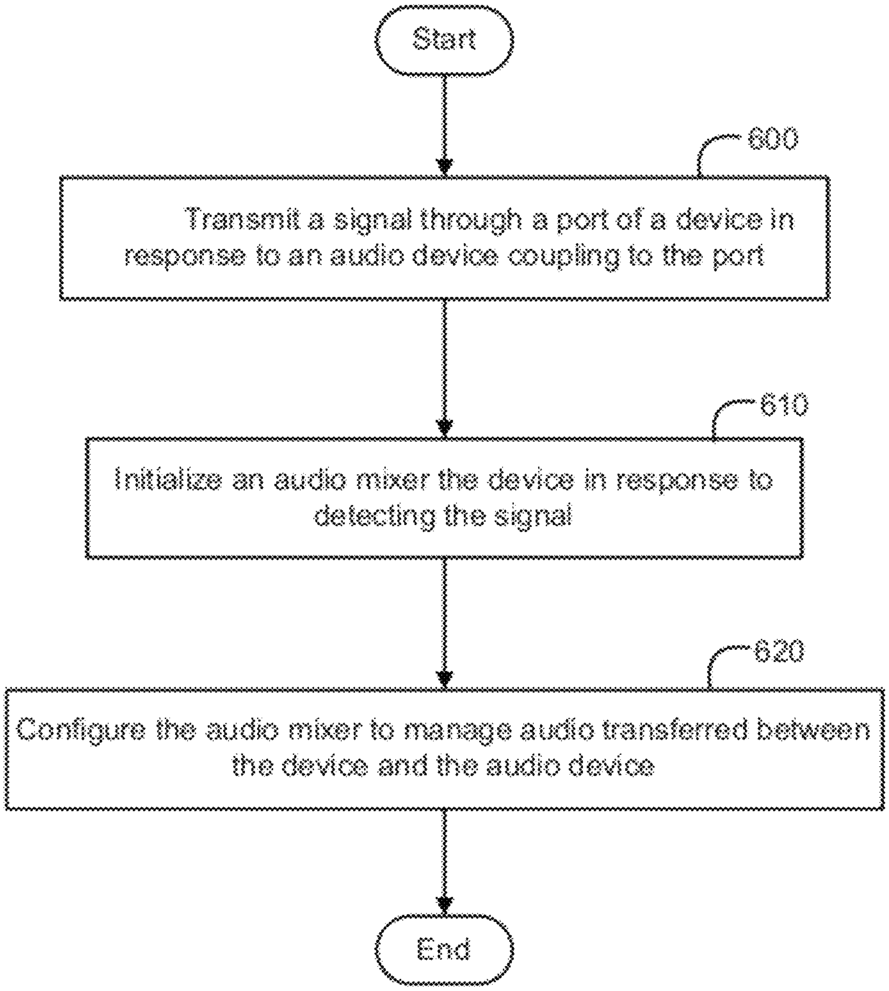
FIG. 6 is a flow chart illustrating a method for managing audio of a device according to an embodiment of the invention.

FIG. 6 is a flow chart illustrating a method for managing audio of a device according to an embodiment of the invention. The method of FIG. 6 uses a device with a processor, at least one port, a communication channel, a storage device, a codec, an audio mixer, and an audio application. In other embodiments, the method of FIG. 6 uses additional components and/or devices in addition to and/or in lieu of those noted above and illustrated in FIGS. 1, 2, 3, 4, and 5.

As noted above, the audio application is an application which can independently or in conjunction with the processor use the audio mixer to manage and/or control audio transferred between the device and an audio device coupled to the device. Additionally, the audio mixer can be included in a codec of the device. Further, an audio device includes a speaker, a headphone, a microphone, and/or any device which can input and/or output audio with the device. The audio device can couple to the device through a port of the device. As noted above, the port is a component of the device which can couple and/or interface an audio device with the device.

Additionally, the port is coupled to the processor and/or the audio application through a communication channel and is configured to transmit a signal through the communication channel in response to an audio device coupling to the port. In one embodiment, the port is an audio jack and the audio device can additionally include an interface configured to physically insert into the audio jack when coupling to the port. In another embodiment, the port and/or the interface can include wireless technology configured to couple and interface with one another when coupling the audio device to the device.

When determining whether an audio device has coupled to the port, the audio application and/or the processor can detect a signal transmitted through the port in response to the audio device coupling to the port 600. As noted above, a signal can be an analog and/or digital signal which is generated by the audio device or a component of the port. Further, the component can be a mechanical or electrical switch which can be triggered to generate a signal through the port in response to detecting an audio device coupling to the port.

In response to detecting a signal in the communication channel, the processor and/or the audio application will determine that an audio device is coupled to the device. Additionally, the processor and/or the audio application will proceed to initialize the audio mixer 610. When initializing the audio mixer, the audio mixer can transition from a disabled state to an enabled state. As noted above, the audio mixer defaults into a disabled state when no audio device is coupled to the device. When in a disabled state, the audio mixer does not manage any audio of the device or the audio device. Additionally, when in the disabled state, an amount of noise from clicking or popping can be reduced.

Once the audio mixer has transitioned into an enabled state, the audio mixer can be configured to manage audio signals transferred between the audio device and the device 620. As noted above, when managing audio, the audio mixer can route, modify, and/or combine audio signals in response to connecting or interfacing an input channel of a codec with an output channel of the codec. In response to connecting or interfacing the input channel with the output channel, audio sent from the device, the processor, the audio application, or another component of the device to the audio device can be routed, modified, and/or combined by the audio mixer. Additionally, audio received from the audio device can be routed, modified, and/or combined by the audio mixer.

In one embodiment, when managing audio, the audio mixer can further be muted. When muting the audio mixer, the input channel and/or the output channel can be muted. As noted above, the input channel of the codec is muted if no audio signal is detected from the audio device. Additionally, the output channel can be muted if no audio signal is detected from the processor, the audio application, and/or another component of the device. In other embodiments, the method of FIG. 6 includes additional steps in addition to and/or in lieu of those depicted in FIG. 6.

Figure 7:
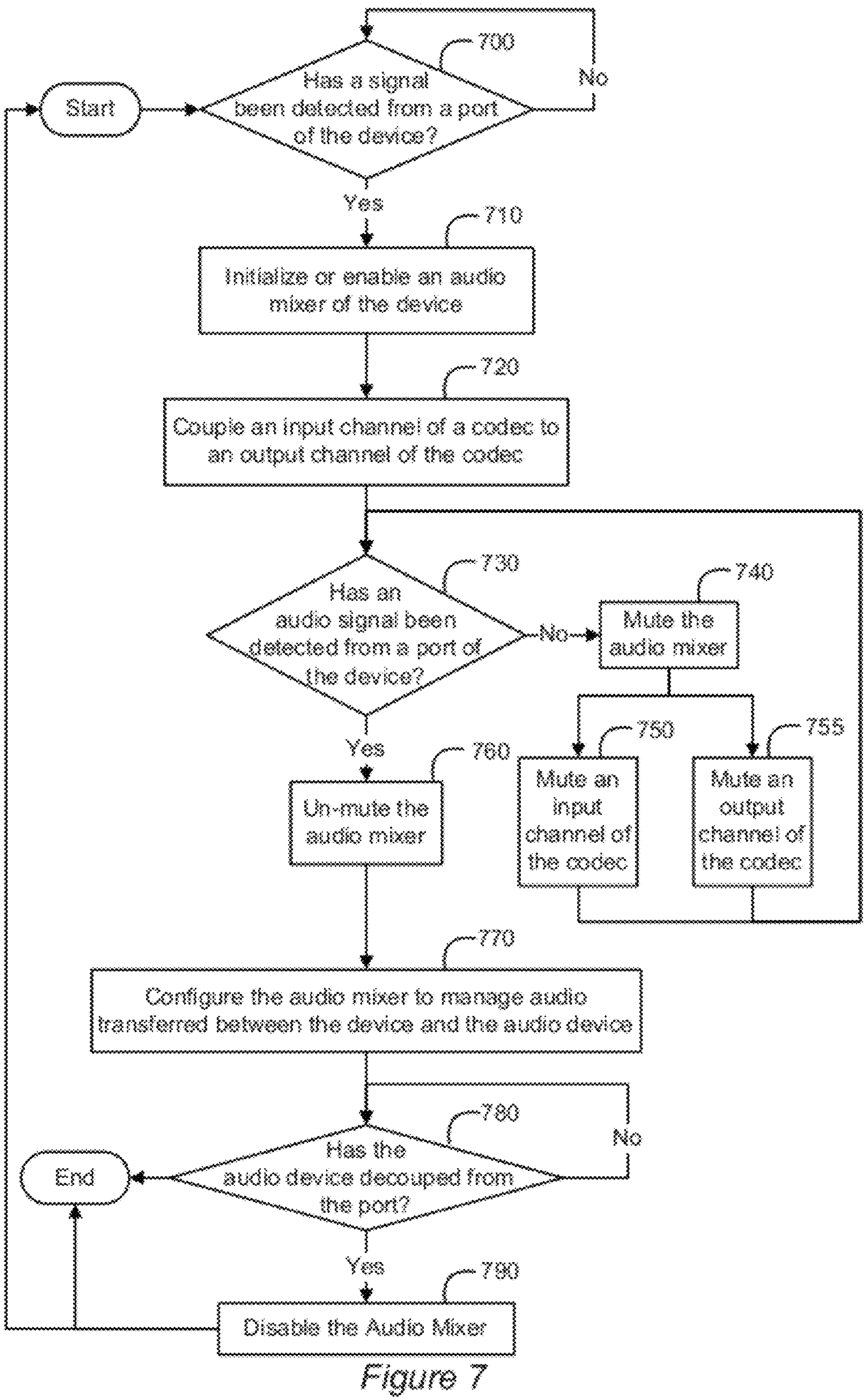
FIG. 7 is a flow chart illustrating a method for managing audio of a device according to another embodiment of the invention.

FIG. 7 is a flow chart illustrating a method for detecting an input according to another embodiment of the invention. Similar to the method disclosed above, the method of FIG. 7 uses a device with a processor, at least one port, a communication channel, a storage device, a codec, an audio mixer, and an audio application. In other embodiments, the method of FIG. 7 uses additional components and/or devices in addition to and/or in lieu of those noted above and illustrated in FIGS. 1, 2, 3, 4, and 5.

As noted above, the processor and/or the audio application initially determine whether a signal has been detected from a port of the device 700. As noted above, the port is coupled to the processor and/or the audio application through the communication channel. Additionally, the signal is generated by a component of the port or the audio device and the port transmits any signal through the communication channel.

When determining whether a signal has been detected from the port, the processor and/or the audio application can periodically, actively, or upon request detect or scan the communication channel for a signal from the port. If no signal is detected, the processor and/or the audio application can continue to detect or scan for a signal from the port 700. Once a signal has been detected, the processor and/or the audio application will proceed to initialize or enable the audio mixer 710. As noted above, the audio mixer can be included in a codec of the device. Additionally, the processor and/or the audio application can transfer any detected signal to the audio mixer and/or the codec.

As noted above, the audio mixer can be configured to default into a disabled state when no audio device is coupled to the port or the device. As a result, unwanted clicking or popping noise generated from the audio device coupling to the port can be reduced. Additionally, when initializing the audio mixer, the processor, the audio application, and/or the codec can configure the audio mixer to transition into the enabled state. Once the audio mixer has been enabled, the audio mixer can proceed to couple an input channel of the codec to an output channel of the codec 720.

In response to coupling an input channel to an output channel, the audio mixer, the codec, the processor, and/or the audio application can determine whether the input channel and/or the output channel include an audio signal that has been transmitted from the port of the device 730. As noted above, the codec can analyze a signal transferred from the processor and/or the audio application and determine whether the signal includes audio data. If the signal includes audio data, the signal will be identified as an audio signal and the audio mixer can be configured to un-mute 760.

In another embodiment, if the signal does not include any audio data, the processor, the audio application, the codec, and/or the audio mixer will determine that no audio signal has been detected and the audio mixer will be muted 740. By muting the audio mixer, an amount of clicking or popping noise can continue to be reduced while the audio device is coupled to the device. In one embodiment, when the audio mixer is muted, the input channel can be muted and configured not to receive or input any audio 750. In another embodiment, when the audio mixer is muted, the output channel can be configured to not send or output any audio 755.

Additionally, when muted, processor, the audio application, the codec, and/or the audio mixer can continue to determine whether an audio signal has been detected 730. Once the audio mixer has been un-muted, the processor and/or the audio application can configure or instruct the audio mixer to manage audio transferred between the device and the audio device 770. As noted above, the audio mixer can manage audio transferred between the device and the audio device by routing, modifying, and/or combining audio encoded and/or decoded by the codec.

In one embodiment, the processor, the audio application, the codec, and/or the audio mixer additionally determine whether the audio device has decoupled from the port of the device 780. The processor, the audio application, the codec, and/or the audio mixer can continue to monitor the communication channel for one or more signals transferred through the port. If one or more signals continue to be detected in the communication channel, the audio device will be determined to still be coupled to the port and the processor, the audio application, the codec, and/or the audio mixer additionally continue to determine whether the audio device has decoupled from the port of the device 780.

If no signal is detected in the communication channel, the audio device will be determined to have decoupled from the port. In response, the processor, the audio application, and/or the codec will proceed to disable the audio mixer 780. In one embodiment, the audio mixer additionally decouples the input channel from the output channel. The process is then complete or the process can be repeated. In other embodiments, the method of FIG. 7 includes additional steps in addition to and/or in lieu of those depicted in FIG. 7.

What is claimed is:

1. A method for managing audio of a device comprising:
- transmitting a signal through a port of the device in response to an audio device coupling to the port;
- initializing an audio mixer of the device in response to detecting the signal;
- configuring the audio mixer to manage audio transferred between the device and the audio device; and
- detecting whether the signal from the port of the device is an audio signal;
- in which detecting whether the signal from the port of the device is an audio signal comprises determining whether the signal comprises audio data,
- in which, if the signal comprises audio data, determining that an audio signal has been detected; and
- muting the audio mixer if no audio signal is detected from the port.

2. The method for managing audio of a device of claim 1 wherein the audio mixer is included in a codec of the device and an input channel of the codec is coupled to an output channel of the codec in response to initializing the audio mixer.

3. The method for managing audio of a device of claim 1 wherein the audio mixer is disabled when the audio device is not coupled to the port.

4. The method for managing audio of a device of claim 1 further comprising disabling the audio mixer in response to the audio device decoupling from the port.

5. The method for managing audio of a device of claim 1 further comprising un-muting the audio mixer if an audio signal is detected from the port of the device.

6. The method of claim 1, in which muting the audio mixer if no audio signal is detected from the port comprises muting an output channel of the device if no audio signal is detected to be outputted from the device to the audio device.

7. The method of claim 1, in which muting the audio mixer comprises maintaining the audio mixer in an enabled state.

8. The method of claim 1, in which muting the audio mixer if no audio signal is detected from the port comprises muting an input channel of the device if no audio signal is detected from the audio device.

9. The method of claim 1, in which the audio data is received from the audio device.

10. The method of claim 1, in which if no signal is detected from the port, retaining an input channel in a uncoupled state with respect to an output channel.

11. A device comprising:
- a port configured to detect an audio device coupling to the port and generate a signal in response to detecting the audio device;
- an audio mixer configured to initialize in response to detecting the signal from the port;
- a processor to utilize the audio mixer when managing audio transferred between the device and the audio device;
- in which the processor detects for an audio signal from the port of the device and mutes the audio mixer if no audio signal is detected from the port,
- in which if no signal is detected from the port, retaining an input channel in a uncoupled state with respect to an output channel.

12. The device of claim 11 wherein the port includes an audio jack configured to couple and interface with the audio device.

13. The device of claim 11 wherein the port includes at least one from the group consisting of an infrared device, a Bluetooth device, and a radio device configured to wirelessly couple with the audio device.

14. The device of claim 11 wherein the port includes a component configured to detect the audio device coupling to the port and the component is triggered to generate the signal in response to the audio device coupling to the port.

15. The device of claim 14 wherein the component includes at least one from the group consisting of a mechanical switch and an electrical switch.

16. A computer-readable program in a non-transitory computer-readable medium comprising:
- an audio application configured to detect a signal generated from a port of a device in response to an audio device coupling to the port;
- wherein the audio application is additionally configured to initialize an audio mixer in response to detecting the signal;
- wherein the audio application is further configured to utilize the audio mixer to manage audio transferred between the device and the audio device;
- wherein the audio mixer, when utilized by the audio application, couples an input channel with an output channel to manage audio transferred between the device and the audio device via the port; and wherein the audio mixer mutes an input channel of the device if no audio signal is detected from the audio device and the audio mixer mutes an output channel of the device if no audio signal is detected to be outputted from the device to the audio device.

* * * * *